United States Patent [19]

Kowalsky

[11] Patent Number: 4,545,105

[45] Date of Patent: Oct. 8, 1985

[54] METHOD OF MAKING BRIGHT-FACED REINFORCED PLASTIC BUMPER

[75] Inventor: Martin I. Kowalsky, Rochester, Mich.

[73] Assignee: Autodynamics Corporation of America, Madison Heights, Mich.

[21] Appl. No.: 529,747

[22] Filed: Nov. 1, 1983

Related U.S. Application Data

[62] Division of Ser. No. 310,374, Oct. 13, 1981, abandoned.

[51] Int. Cl.$^4$ .............................................. B21D 35/00
[52] U.S. Cl. ..................................... 29/469.5; 72/347; 156/212; 156/224; 156/475; 156/494; 264/291; 293/120; 425/398; 425/DIG. 48
[58] Field of Search ............... 29/469.5, 445; 293/120, 293/10, 2; 156/163, 212, 216, 224, 229, 475, 494; 264/291, 292; 72/76, 347, 342; 425/398, DIG. 48

[56] References Cited

U.S. PATENT DOCUMENTS

| | | | |
|---|---|---|---|
| 2,270,185 | 1/1942 | Dulmage | 72/347 X |
| 2,458,864 | 1/1949 | Lindsay | 156/224 |
| 2,797,179 | 6/1957 | Reynolds et al. | 156/224 X |
| 3,028,667 | 4/1962 | Wintermute et al. | 29/469.5 |
| 3,140,325 | 7/1964 | Graff | 156/224 X |
| 3,220,102 | 11/1965 | Lieberman et al. | 425/DIG. 48 UX |
| 3,340,742 | 9/1967 | Pohl et al. | 72/342 |
| 3,960,639 | 6/1976 | Kudo | 29/469.5 X |
| 4,208,069 | 6/1980 | Huber et al. | 293/102 |

FOREIGN PATENT DOCUMENTS 114635  9/1980  Japan ................................. 293/120

Primary Examiner—Charlie T. Moon
Attorney, Agent, or Firm—Gerald E. McGlynn, Jr.

[57] ABSTRACT

A structural article such as an automobile bumper includes a plastic body portion having an outer surface and a single metal sheet stretched to be completely disposed about and fixedly secured to the outer surface. The body portion provides a structural member and the metal sheet provides a continuous metal trim thereon.

A method of forming the structural article includes the steps of compressing a sheet of metal and a sheet of heated softened plastic material within a mold so as to simultaneously cool the plastic material during the compression to set the molded plastic and stretch the metal about the outer surface of the molded plastic.

An apparatus for forming the structural article includes a female mold portion including a clamping frame disposed about the periphery thereof. The clamping frame includes toggle clamps for clamping the peripheral edges of the sheet of metal to the periphery of the female portion. A male compression member is adapted to compress the sheet of heated softened plastic, the sheet of metal, and an adhesive disposed therebetween, so as to simultaneously cool the plastic during the compression to set the molded plastic, cure the adhesive between the sheets of metal and plastic, and to stretch the metal about the outer surface of the molded plastic.

8 Claims, 3 Drawing Figures

METHOD OF MAKING BRIGHT-FACED REINFORCED PLASTIC BUMPER

This application is a division of application Ser. No. 310,374, filed Oct. 13, 1981, now abandoned.

BACKGROUND OF THE INVENTION (1) Field of the Invention

The instant invention relates to a structural load-bearing member having a plastic body and a bright metal finish. A method and apparatus used for forming the structural load-bearing member is also disclosed.

(2) Description of the Prior Art

The prior art includes four methods for disposing a bright metal trim on a plastic surface. The first method consists of applying a vapor metal deposit to a plastic surface. The second method is referred to as "vacuum metalizing" wherein a metal mist is applied to the substrate surface in a vacuum. The third method is referred to as "true plating" and employs applying the metal onto a conductive surface. The fourth method involves dipping the substrate into a chroming tank.

The aforementioned methods do not provide a full metal surface on the substrate, nor do they provide the durability of tempered stainless steel. Further, the aforementioned methods provide a metal surface susceptible to flaking.

The instant invention provides an article having a sheet of stainless steel adhesively secured on a plastic, thereby resulting in a continuous metal surface as opposed to the prior art methods of disposing a non-continuous metal coating on a plastic surface.

SUMMARY OF THE INVENTION

The instant invention provides a structural article comprising a plastic body portion having an outer surface, and a single metal sheet stretched to be completely disposed and fixedly secured to the outer surface whereby the body portion provides a structural member and the metal sheet provides a continuous metal trim thereon.

The instant invention further provides a method of forming the structural article including the steps of compressing the sheet of metal and the sheet of heated, softened plastic material within a mold so as to simultaneously cool the plastic material during the compression to set the molded plastic and stretch the metal about the outer surface of the molded plastic.

An apparatus for forming the structural article is also disclosed. The apparatus comprises a female mold portion including a clamping frame disposed about the periphery thereof, the frame including clamps for clamping the peripheral edges of the sheet of metal to the periphery of the female portion. A male compression member is adapted to compress the sheet of heated, softened plastic, the sheet of metal, and an adhesive disposed therebetween, so as to simultaneously cool the plastic during the compression to set the molded plastic, cure the adhesive between the sheets of metal and plastic, and stretch the metal about the outer surface of the molded plastic.

PRIOR ART STATEMENT

The U.S. Pat. No. 3,014,710 to Layne issued Dec. 26, 1961 teaches a structural load-bearing member comprising a flexible rubber core and a metal outer surface. The Layne patent does not teach a member having a continuous outer metal surface nor does it provide a continuous metal surface which is fixedly secured to the rubber core. Therefore, the Layne patent does not teach a structural article which provides a structural member having a continuous metal trim thereon.

The U.S. Pat. Nos. 3,557,030 to Simons issued Jan. 19, 1971, and 3,564,602 to Peck issued Feb. 16, 1971 teach a method of forming a gasket for a bottle cap or closure wherein a plastic material is heated and pressed to form a flat gasket on the interior surface of the bottle cap. A press is utilized in both patents having a female cavity and a male compression member. However, neither patent teaches the one shot operation of the instant invention wherein both the metal sheet and heated plastic are molded in a single mold operation such that the plastic is adhered to the pressed metal sheet. Additionally, neither patent teaches the use of an addition to the female mold portion for clamping the metal sheet thereto.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF PREFERRED EMBODIMENT

Figure 1:
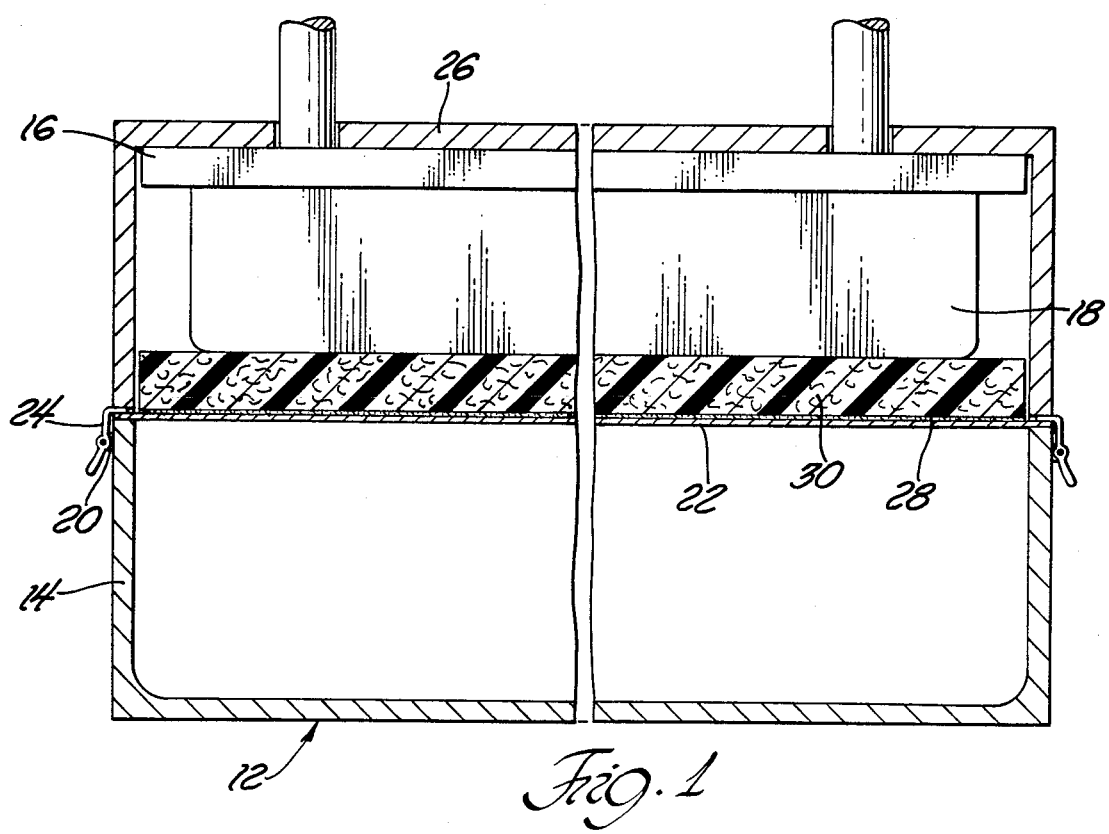
FIG. 1 is a cross sectional schematic elevational view of the subject apparatus in the open position having a sheet of metal clamped thereto and an adhesive and a sheet of plastic disposed over the sheet of metal.
Figure 2:
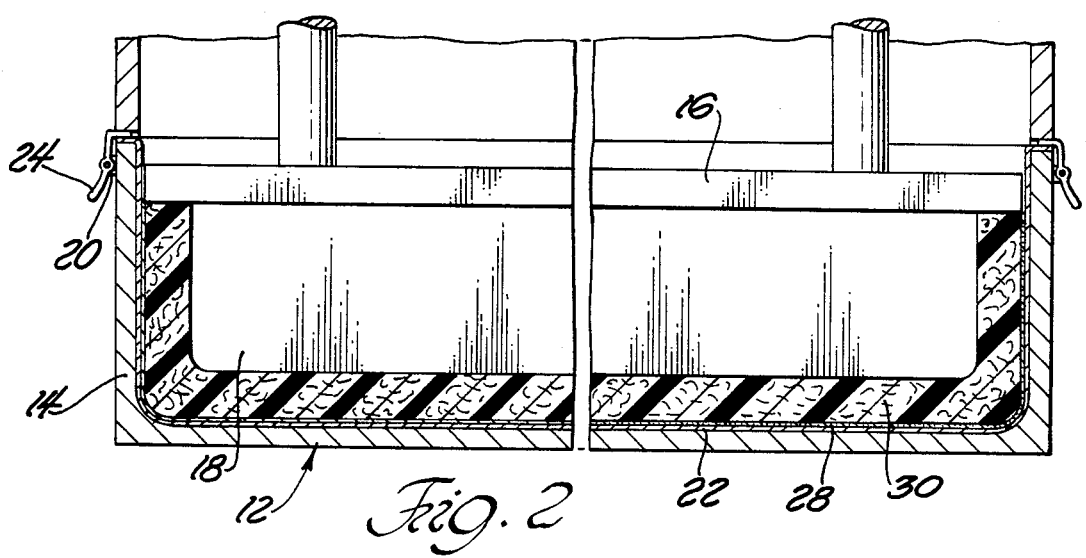
FIG. 2 is a cross sectional schematic elevational view of the subject apparatus in the closed position after having formed the subject structural article.
Figure 3:
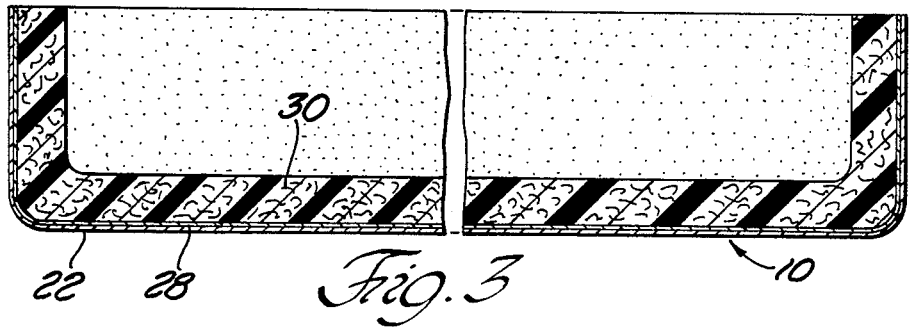
FIG. 3 is a cross sectional schematic elevational view of the subject structural article.

Referring to FIGS. 1 through 3, there is illustrated a preferred apparatus and method for forming an automobile bumper, generally shown at 10, in accordance with the instant invention.

More specifically, the apparatus generally indicated at 12 includes a female mold portion 14 and a male compression member 16, the male compression member 16 having a plug 18 extending downwardly therefrom.

The female mold portion 14 includes a clamping frame 20 for clamping the peripheral edge of a sheet of metal 22 to the periphery of the female portion 14. The clamping frame 20 includes toggle clamps 24 pivotally mounted on the clamping frame 20. The toggle clamps 24 have end portions adapted for engaging the periphery of the sheet of metal 22 to the periphery of the female mold portion 18.

The compression mold 12 may include an upper enclosure 26 for completely enclosing the cavity within a housing.

The instant invention provides a method of forming the subject automobile bumper 10. As shown in FIG. 1, the peripheral edge of a sheet of metal 22 is clamped to the periphery of the female cavity portion 14 of the compression mold 12.

The upper surface of the sheet 22 is etched or scratched by using emery paper or the like. The etching of the metal surface provides an environment conducive to the application of an adhesive 28.

A sheet of suitable thermoplastic 30 is preheated slightly above its melting point. In the preferred embodiment of the instant invention, a fiberglass reinforced thermoplastic is used which is marketed under the trademark "AZDEL" manufactured by PPG. The fiberglass within the plastic provides additional strength and load-bearing capacity for the final product.

An adhesive coating 28 is applied over the etched surface of the stainless steel sheet 22. In the preferred embodiment of the instant invention, Scott's grip plastic adhesive No. 4693 is used. However, other plastic-to-metal adhesives, suited for the particular plastic to be used, can be employed to secure the stainless steel sheet 22 to the thermoplastic 30.

The preheated sheet of fiberglass reinforced thermoplastic 30 is placed over the adhesive coating 28.

The male compression member 16 is closed into the female portion 14 of the mold cavity 12. The sidewalls of the female portion 14 enclose the plastic 30 therein so that the plastic 30 does not escape from the mold 12 during the compression. The male compression member compresses the sheets of thermoplastic 30 and stainless steel 22 within the mold 12 so as to simultaneously cool the plastic during the compression to set the molded thermoplastic, cure the adhesive between the sheets of stainless steel 22 and thermoplastic 30, and to stretch the stainless steel sheet 22 about the outer surface of the molded thermoplastic 30.

The male compression member 16 is closed into the female portion 14 of the mold cavity 12 at a pressure of at least 100 pounds per square inch. Most commonly, the method requires that the male compression member 16 be closed into the female portion 14 in the range of 1,000 to 2,000 pounds per square inch. Of course, the necessary pressure will depend upon the nature of the thermoplastic and metal used. Once the pressure reaches 6,000 lbs. per square inch or greater, it has been found that the thermoplastic begins to decompose. As previously stated, this would be a function of the composition and flexibility of the plastic.

After the compression step, the bumper 10 is removed and the ends of the metal sheet 22 are trimmed to form the final product. Thusly, the instant invention provides a method of forming a bright trimmed plastic bumper in a one shot operation. In other words, in a one step compression, the bumper is formed, the metal is stretched, and the adhesive is cured so as to secure the bright trim about the plastic body. Therefore, the instant invention provides an economical method of manufacturing a novel structural member. Of course, the method can be used for manufacturing structural parts other than bumpers.

The stainless steel sheet 22 provides a bright outer trim which is aesthetically suitable for automobile bumpers. Since the instant invention can be adapted to other structural members such as refrigerator parts or stove parts, various metals can be used in sheet form to provide the outer metal finish. Additionally, various plastics can be used in forming the body portion 30 having specific characteristics and qualities consistent with the desired use.

The stretched sheet of stainless steel 22 disposed over the plastic body portion 30, as shown in FIGS. 2 and 3, provides a continuous metal surface thereon. Therefore, the instant invention is different from prior art structural members wherein a metal composition is disposed on a plastic surface thereby providing a discontinuous metal coating. The prior art metal coatings have a tendency to flake after continuous use, whereas the stainless steel sheet 22 stretched on the plastic core 30 will not flake.

Generally, a sheet of light gauge bright metal is used. In practice, the gauge of the metal used will depend on the nature of the final product. However, the metal functions as a bright trim to be disposed over the shock absorbing plastic core.

The invention has been described in an illustrative manner, and it is to be understood that the terminology which has been used is intended to be in the nature of words of description rather than of limitation. Obviously, many modifications and variations of the present invention are possible in light of the above disclosure. It is, therefore, to be understood that, within the scope of the appended claims, the invention may be practiced otherwise than as specifically described.

The embodiments of the invention in which an exclusive property or privilege is claimed are defined as follows:

1. A method of forming a structural article including a plastic body portion having an outer surface and including a single sheet of metal stretched to be disposed about and fixedly secured to the outer surface, the method including the steps of placing a sheet of metal having an adhesive covered upper surface over a female mold cavity, preheating a sheet of plastic material to a temperature slightly above its melting point to soften the sheet, placing the preheated and softened sheet of plastic over said adhesive covered metal sheet, and drawing and compressing the metal sheet and softened plastic sheet into the female mold cavity to simultaneously cool the plastic material during the compression to set the molded plastic and stretch the metal about the outer surface of the molded plastic so as to form a structural member having a metal trim on the outer surface thereof adhesively bonded to the molded plastic.

2. A method as set forth in claim 1, including the steps of disposing an adhesive covering over the metal sheet prior to placing the softened sheet of plastic over the metal sheet, and curing the adhesive between the sheets of metal and plastic material simultaneously as the plastic material cools and the metal is stretched thereabout during the compressing of the sheets within the mold.

3. A method as set forth in claim 1, including the steps of clamping the peripheral edge of the sheet of metal to the periphery of the female mold forming the mold cavity; applying an adhesive coating over the upper surface of the sheet of metal; placing the heated sheet of plastic over the adhesive coating; and closing a male compression member into the female mold cavity, the male compression member compressing the sheets of metal and plastic within the mold so as to simultaneously cool the plastic during the compression to set the molded plastic, cure the adhesive between the sheets of metal and plastic, and stretch the metal about the outer surface of the molded plastic.

4. The method as set forth in claim 3 further including etching the upper surface of the metal prior to applying the adhesive coating.

5. The method as set forth in claim 4 further including closing the male compression member into the female portion of the mold cavity at a pressure of at least 100 lbs. per square inch.

6. A method as set forth in claim 5 further including closing the male compression member into the female portion of the mold cavity at a pressure between 1,000 and 2,000 lbs. per square inch.

7. The method as set forth in claim 5 further including decreasing the volume of the plastic during the closing of the male compression member into the female portion of the mold cavity.

8. A method of forming an automobile bumper including a fiberglass reinforced polypropylene body portion having a generally cup-shaped outer surface and a cup-shaped inner cavity and including a single sheet of stainless steel fixedly secured to the outer surface of the body portion and stretched to be disposed about the outer surface, the method including the steps of clamping the peripheral edge of a sheet of stainless steel to the periphery of a female portion of a compression mold cavity; etching the upper surface of the steel; applying an adhesive coating over the etched upper surface of the steel; preheating a sheet of fiberglass reinforced polypropylene above the melting point thereof; placing the preheated sheet of polypropylene over the adhesive coating; and closing a male compression member into the female portion of the mold cavity, the male compression member drawing and compressing the sheets of polypropylene and steel within the mold so as to simultaneously cool the polypropylene during the compression to set the molded polypropylene, cure the adhesive between the sheets of steel and polypropylene, and to stretch the steel about the outer surface of the molded polypropylene.

* * * * *